US012144425B2

(12) United States Patent
Kachirski

(10) Patent No.: US 12,144,425 B2
(45) Date of Patent: Nov. 19, 2024

(54) MOTORISED CHAIR

(71) Applicant: Bill Kachirski, Adelaide (AU)

(72) Inventor: Bill Kachirski, Adelaide (AU)

( * ) Notice: Subject to any disclaimer, the term of this patent is extended or adjusted under 35 U.S.C. 154(b) by 178 days.

(21) Appl. No.: 17/632,838

(22) PCT Filed: Oct. 18, 2019

(86) PCT No.: PCT/AU2019/051141
§ 371 (c)(1),
(2) Date: Feb. 4, 2022

(87) PCT Pub. No.: WO2021/022313
PCT Pub. Date: Feb. 11, 2021

(65) Prior Publication Data

US 2022/0265047 A1 Aug. 25, 2022

(30) Foreign Application Priority Data

Aug. 5, 2019 (AU) ................................ 2019902797

(51) Int. Cl.
*A47C 1/02* (2006.01)
*A61G 5/04* (2013.01)

(52) U.S. Cl.
CPC ................ *A47C 1/02* (2013.01); *A61G 5/045* (2013.01); *A61G 2200/16* (2013.01); *A61G 2203/14* (2013.01)

(58) Field of Classification Search
CPC ........ A47C 1/02; A47C 1/03211; A61G 5/045
See application file for complete search history.

(56) References Cited

U.S. PATENT DOCUMENTS 5,044,647 A * 9/1991 Patterson ............... A61G 5/128 297/344.14
5,351,774 A * 10/1994 Okamoto .................. F16F 1/22 267/229
6,481,514 B2 * 11/2002 Takada ................... A61G 5/047 180/11
8,128,120 B2 * 3/2012 Porcheron ............ A61G 5/1059 280/647
8,602,138 B2 * 12/2013 Filkoski ................. A61G 5/047 280/250
9,615,982 B2 * 4/2017 Richter ................. B60B 19/003
9,796,401 B1 * 10/2017 Ammirati .............. B62B 5/005
(Continued)

FOREIGN PATENT DOCUMENTS

AU 2018241134 1/2019
CN 113142858 A * 7/2021 ............... A47C 1/02
(Continued)

OTHER PUBLICATIONS

High Speed Off-Road Electric Recliner Race!! [Viewed on internet on Oct. 25, 2019] Viewed on internet. <URL: https://www.youtube.com/watch?v=QXeQYoMkZVQ>, Published on Oct. 19, 2018 Times 1:20-2:07, 2:14-2:21, 2:30-2:35.

*Primary Examiner* — Timothy J Brindley
(74) *Attorney, Agent, or Firm* — Sand, Sebolt & Wernow Co., LPA

(57) ABSTRACT

A chair comprising a sub-frame in contact with the ground and connected to the chair the sub-frame including four wheels to support the chair on the ground and a set of powered driving wheels connected to the rear of the sub-frame to allow the chair to be propelled.

5 Claims, 3 Drawing Sheets

(56) References Cited

U.S. PATENT DOCUMENTS

| | | | | |
|---|---|---|---|---|
| 11,478,396 | B2 * | 10/2022 | Kirschey | A61H 3/04 |
| 2004/0046358 | A1 * | 3/2004 | White | A61G 5/1075<br>280/304.1 |
| 2011/0272200 | A1 * | 11/2011 | Clapp | A61G 7/018<br>297/118 |
| 2012/0174319 | A1 * | 7/2012 | Menkedick | A61G 7/015<br>5/613 |
| 2012/0279789 | A1 * | 11/2012 | Brill | A61G 5/047<br>180/6.5 |
| 2014/0265497 | A1 * | 9/2014 | Hough | A61G 5/101<br>297/316 |
| 2017/0319416 | A1 * | 11/2017 | Bailey | A61G 15/125 |
| 2018/0203522 | A1 | 7/2018 | Stucki et al. | |
| 2021/0045945 | A1 * | 2/2021 | Cooper | A61G 5/024 |
| 2021/0085541 | A1 * | 3/2021 | Takei | A61G 5/045 |
| 2022/0047438 | A1 * | 2/2022 | Tripepi | A61G 5/1045 |
| 2022/0408937 | A1 * | 12/2022 | Jacobs | A47C 7/744 |
| 2023/0192222 | A1 * | 6/2023 | Nakagawa | B62J 1/08<br>280/283 |

FOREIGN PATENT DOCUMENTS

| | | | | | |
|---|---|---|---|---|---|
| DE | 202019100213 | U1 * | 3/2019 | A47C 1/0242 |
| GB | 2585939 | A * | 1/2021 | A47C 1/02 |
| GB | 2588447 | A * | 4/2021 | A47C 1/02 |
| WO | WO-2018232456 | A1 * | 12/2018 | A47C 1/0242 |

* cited by examiner

MOTORISED CHAIR

FIELD OF THE INVENTION

The present invention relates to motorised chairs, and in particular to recliner chairs that can be moved with the assistance of electric motors.

BACKGROUND TO THE INVENTION

Reclining chairs are well known with tens of thousands of chairs being produced monthly. Typically a chair will have two drive mechanisms, the first to recline the back of the chair and the second to extend the footrest. These mechanisms may also interact with the seat bottom to provide a small variation in tilt. Such motorised chairs have found wide acceptance in homes around the world and are particularly favoured by the aged or infirm, particularly people with medical conditions. Similar chairs with further drive mechanisms to independently tilt the back with respect to the base are also popular for bariatric use.

Some of the recliner chairs are zero gravity chairs which are movable to a heart-rest, or Trendelenburg, position in which the legs are raised to be level with or above the heart are used widely in clinical and even home situations to alleviate blood pooling in the legs and improve or increase blood/fluid circulation. The reader is referred to the applicants AU patent 2018241134 whose contents are incorporated by reference herein.

Some chairs are also supported on wheels that allow the chair to be moved. The aged or infirm typically find it difficult to move the chair requiring the assistance of another person thus restricting their use.

It would be desirable to provide for a motorised chair that would allow the user to move the chair when they are supported by it to benefit a large number of aged, infirm or obese people.

The object of this invention is to provide a reclining chair with additional driving wheels that allow the chair to be moved by the user, or at least provide the public with a useful alternative.

SUMMARY OF THE INVENTION

In a first aspect the invention provides a chair comprising a sub-frame in contact with the ground and connected to the chair the sub-frame including four wheels to support the chair on the ground and a set of powered driving wheels connected to the rear of the sub-frame to allow the chair to be.

In preference wherein electric motors are connected to the driving wheels though a gearbox.

Preferably the chair is a recliner chair.

Preferably a controller is provided to control the operation of the driving wheels.

Preferably a further controller is located at the back of the chair to enable another person to control movement of the chair.

The chair may be a geriatric chair or a bariatric chair.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DRAWING COMPONENTS

Figure 1:
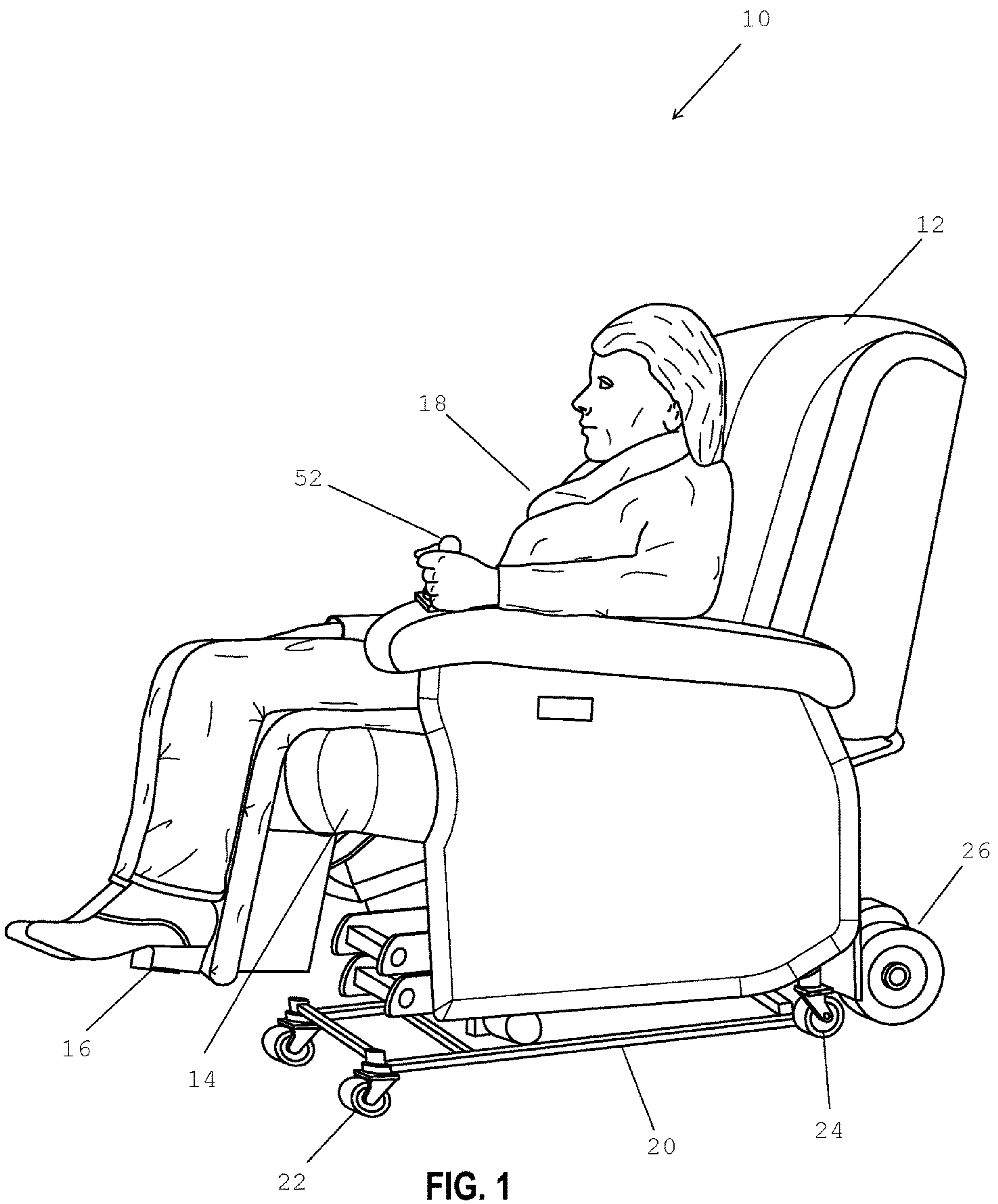
FIG. 1 shows a perspective view of a reclining chair incorporating the invention.
Figure 2:
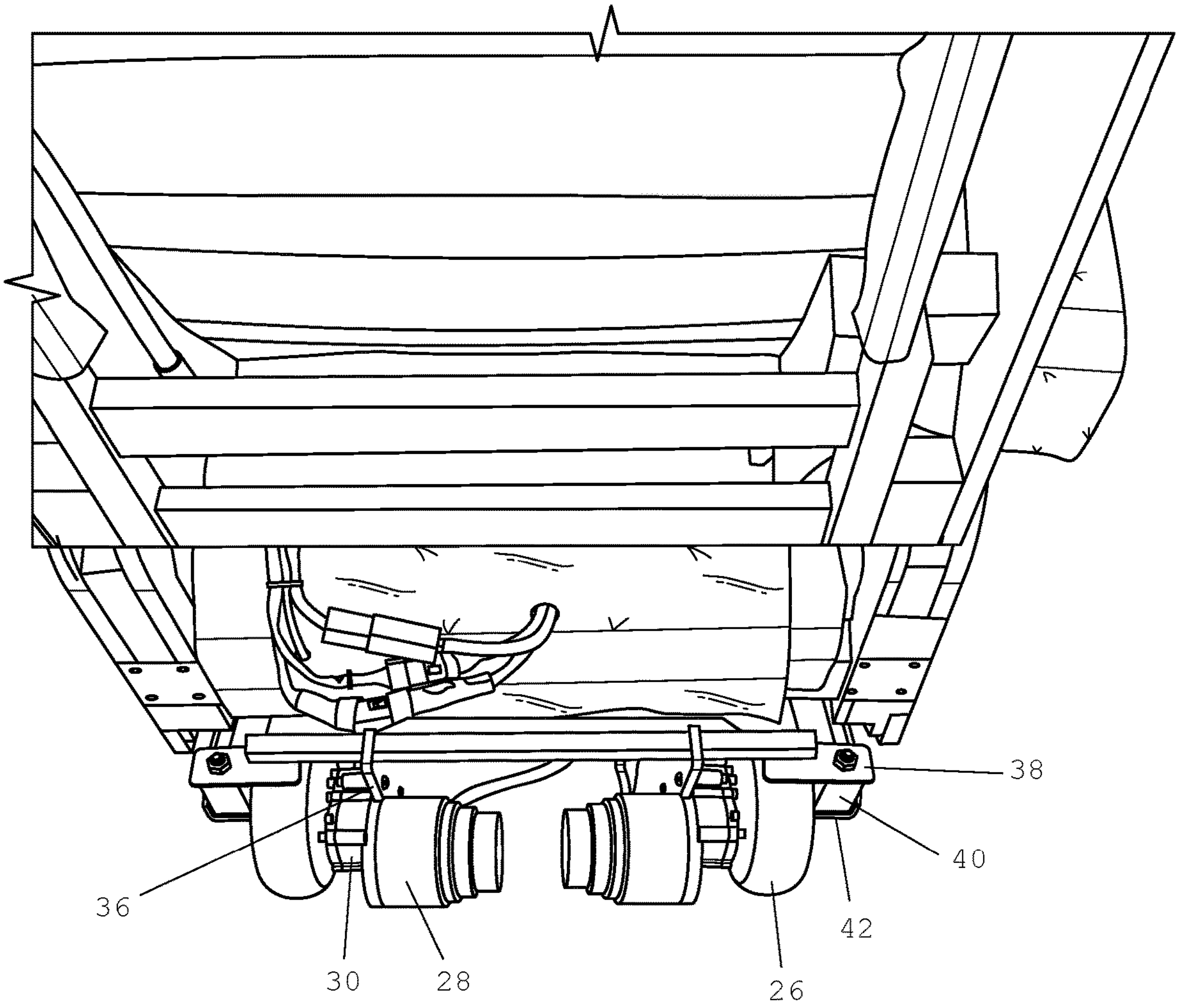
FIG. 2 is a rear view of a recliner chair incorporating the invention.

The drawings include the following integers.

10 reclining chair
12 back
14 seat
16 footrest
18 person
20 sub-frame
22 front wheels
24 rear wheels
26 driving wheels
28 electric motors
30 gearbox
32 support bar
34 rear sub-frame bar
36 plates
38 flange
40 spacer
42 bottom support
44 second sub-frame
46 drive mechanism
48 motor
50 linear actuator
52 joystick

DETAILED DESCRIPTION OF THE INVENTION

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

The present invention provides driving wheels drive be electric motors that can propel a recliner chair or for that matter any chair that is supported by wheels. It can be combined with a simple motorised tilting mechanism for a reclining chair allowing it to be placed in a zero gravity position that comprises two sub-frames which pivot in relation to each other thus providing a simple tilting mechanism for typical geriatric and bariatric chairs.

Turning now to the Figures in details there is illustrated a reclining chair 10 including a back 12, seat 14 and footrest 16 that support a person 18. The chair is supported on a sub-frame 20 that includes front wheels 22 and rear wheels 24. Attached to and across the sub-frame are driving wheels 26 that are driven by electric motors 28 through gearboxes 30. The driving wheels can be controlled to propel the chair forward or backward and to operate at different speeds thus allowing the chair to effectively be able to turn.

Figure 3:
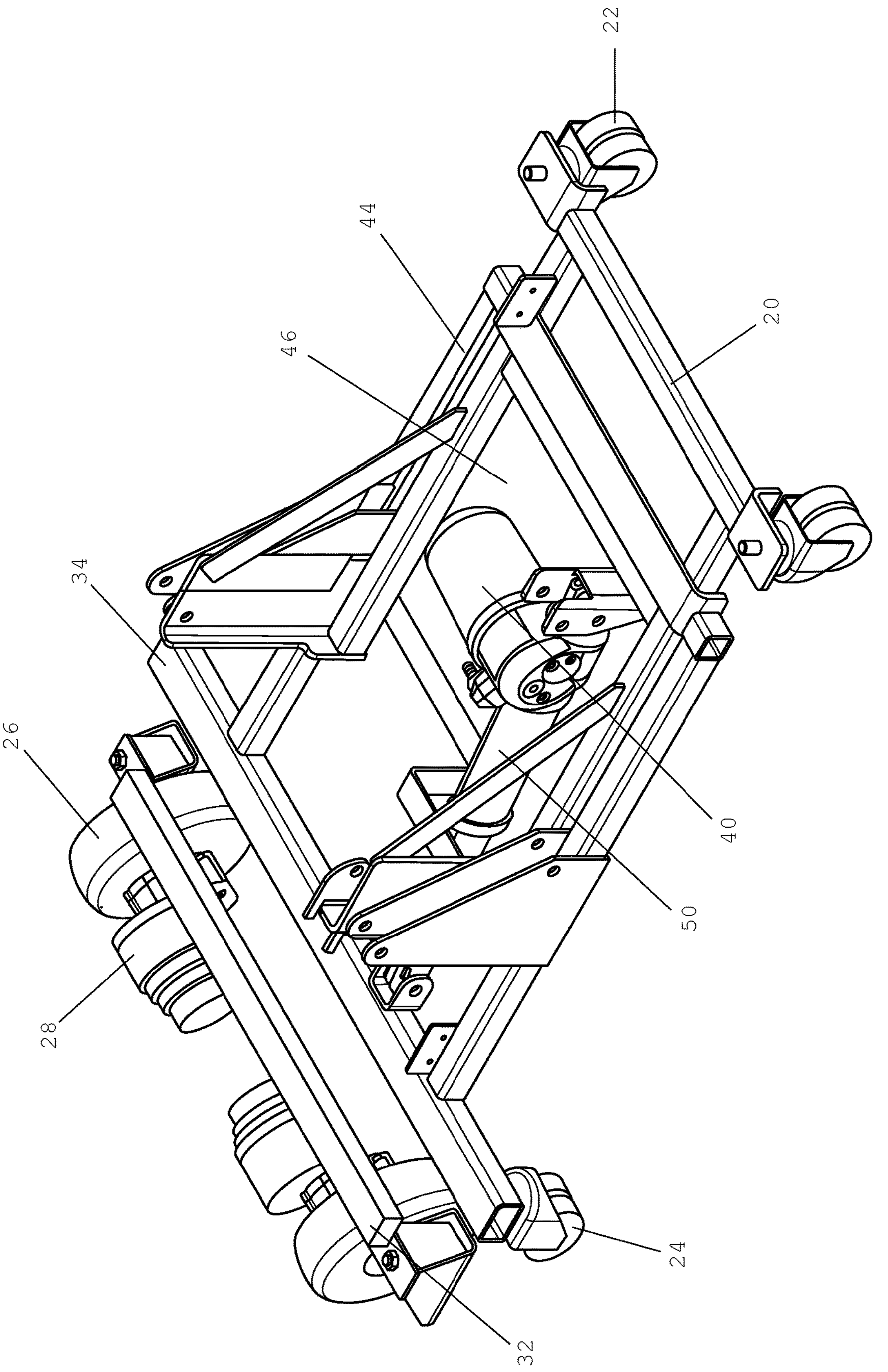
FIG. 3 is a perspective view of the recliner chair frame incorporating the invention.

The driving wheels, electric motors and gearboxes are all attached to a support bar 32 that typically replaces rear sub-frame bar 34 or is attached to it. Downward plates 36 (FIG. 3) provide an attachment point for the support bar 32. Flanges 38 extend horizontally above the driving wheels attached through a spacer 40 to bottom support 42 that ensures that there is strength in the mechanism especially for bariatric chairs.

The Figures are not intended to provide details of the mechanisms, but convey how the invention is incorporated into a typical reclining chair mechanism which would be recognised by those skilled in the art. The prior art (not shown) may have either one or two drive motors and associated linkages to achieve reclining and leg rest extension functions. There are yet further invention is aimed equally at bariatric chairs which typically have a further motor to independently recline the back of the chair. The recliner may also comprise a second sub-frame 44 including drive mechanisms 46 and electric motor 48 to pivot the sub-frames with respect to each other through linear actuator 50.

Various geometries could be used for the sub-frames. Preferably the sub-frames are simple rectangles made from tubular or flat steel. The sub-frames lie in the same plane to provide a horizontal base to which the remaining chair components can be mounted. The majority of the chair components, i.e. the back, seat and footrest and associated hardware and drive mechanisms, are mounted directly or indirectly by various brackets to the sub-frames as required.

To operate the driving wheels a joystick may be provided on the chair. A further joystick may be provided at the rear of the chair to enable another person to propel and control it (not shown). A battery obviously provides the power to operate the chair (not shown). Other required components would be well known to the skilled addressee The reader will now appreciate the present invention which provides a simple mechanism propel a chair and controlled by the person typically using the chair. This provides for extra mobility for the elderly and frail.

Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word “comprising” and its derivatives including “comprises” and “comprise” include each of the stated integers but does not exclude the inclusion of one or more further integers.

The invention claimed is:

1. A recliner chair comprising:

a sub-frame in contact with the ground and connected to the recliner chair;

the sub-frame including four unpowered wheels to support the recliner chair on the ground;

a set of powered driving wheels connected to and extending rearwardly from the rear of the sub-frame to allow the recliner chair to be propelled;

wherein the powered driving wheels are the rearmost wheels on the recliner chair;

wherein a diameter of each of the powered driving wheels is greater than a diameter of each of the unpowered wheels;

wherein the powered driving wheels are in contact with the ground;

wherein the powered driving wheels are operable individually at different speeds;

wherein the recliner chair is configured to be operable by a seated occupant; and wherein the recliner chair is selectively operable to be reclined.

2. The recliner chair of claim 1 wherein electric motors are connected to the driving wheels though a gearbox.

3. The recliner chair as in claim 1 further comprising a controller provided to control the operation of the driving wheels.

4. The recliner chair as in claim 3 further comprising a further controller located at a back of the recliner chair to enable another person to control movement of the recliner chair.

5. The recliner chair as in claim 1 where all of the powered wheels and all of the unpowered wheels remain in contact with the ground at all times whether the recliner chair is in an upright orientation or a reclined orientation.

* * * * *